United States Patent
Okuda

(10) Patent No.: US 7,704,636 B2
(45) Date of Patent: Apr. 27, 2010

(54) CELL HAVING FILM OUTER CASING

(75) Inventor: Kazuhiro Okuda, Sumoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 274 days.

(21) Appl. No.: 11/586,492

(22) Filed: Oct. 26, 2006

(65) Prior Publication Data

US 2007/0099076 A1     May 3, 2007

(30) Foreign Application Priority Data

Oct. 27, 2005   (JP)   .............................. 2005-312912

(51) Int. Cl.
*H01M 6/12* (2006.01)
(52) U.S. Cl. .................................................... 429/162
(58) Field of Classification Search ................ 429/185, 429/162, 176, 94, 13, 152, 153, 156, 167, 429/168, 169
See application file for complete search history.

(56) References Cited

U.S. PATENT DOCUMENTS 5,458,993 A * 10/1995 Terao et al. .................... 429/94
5,948,562 A * 9/1999 Fulcher et al. ............... 429/181
2005/0069764 A1* 3/2005 Kodama et al. ............. 429/185

FOREIGN PATENT DOCUMENTS

JP           11-224652         8/1999

\* cited by examiner

*Primary Examiner*—Patrick Ryan
*Assistant Examiner*—Monique Wills
(74) *Attorney, Agent, or Firm*—Westerman, Hattori, Daniels & Adrian, LLP

(57) ABSTRACT

A cell having a film outer casing with high volume energy density and preferably sealing performance is provided. The cell has a flat electrode assembly having a first electrode and a second electrode arranged to opposed to each other via a separator and wound into a flat shape having two flat side R portions. The flat electrode assembly is housed in an outer casing made of a film of a metal layer and a resin layer laminated atop one another. The first electrode is located the outermost layer of the flat electrode assembly. A portion of the first electrode corresponding to an upper end and/or a lower end of at least one of the flat side R portions is cut off. Thus, a separator-exposed portion is formed where a portion of the separator wound immediately inside the outermost layer of the flat electrode assembly is exposed.

2 Claims, 9 Drawing Sheets

-PRIOR ART-

CELL HAVING FILM OUTER CASING

BACKGROUND OF THE INVENTION

1) Field of the Invention

The present invention relates to cells using, as the cell cases, film outer casings (jackets) such as laminate films.

2) Description of the Related Art

Following a demand for a size reduction of mobile electronic appliances such as mobile phones and personal digital assistants, cells and batteries serving as the driving power sources of such appliances are required to be even thinner and lighter in weight.

In order to meet this demand, patent document 1 suggests a light-weight thin cell that uses, as the cell case, a film outer casing formed of a laminate film in which a metal foil, such as aluminum, and resin are laminated, and that has a flat electrode assembly housed in the casing.

Patent Document 1: Japanese Unexamined Application Publication No. 1999-224652.

This laminate film is of the structure that metal layers and resin layers are laminated, as shown in FIG. 5. As shown in FIG. 9, a laminate film having an electrode-housing depressed portion and a plate laminate film are bonded by heat compression or the like at four side edges (4a, 4b, 4c, 4d).

With this technique, an electrode-housing depressed portion for housing the electrode assembly therein is formed in advance, and thus no unnecessary space exists between the electrode-housing depressed portion and the electrode assembly, thereby providing more compact cells.

In recent years, with a growing need for further miniaturization of the cell, an attempt is being made to make shorter the distance between the flat electrode assembly housed in the cell outer casing and the sealed portion, thereby reducing unnecessary space. With this method, however, in the event that the flat electrode assembly is inclined when inserting it into the outer casing, side sealed portions (4b, 4c) are pressed while catching the electrode assembly, as shown in FIG. 8. This causes short circuiting between the electrode plate, which is the outermost layer of the electrode assembly 1, and a metal layer 100 of the laminate film (at the portion circled in the figure), and the metal layer 100 is thus polarized. This leads to corrosion of the metal layer 100, resulting in degradation of sealing performance.

SUMMARY OF THE INVENTION

In view of the foregoing and other problems, it is an object of the present invention to provide a cell using a film outer casing in which satisfactory sealing performance is provided and in which degradation of the sealing performance caused by catching the electrode assembly is prevented.

As a result of a study conducted by the inventors, catching of the flat electrode assembly has been found to occur frequently at the upper ends or lower ends (the four corners of the electrode assembly) of the side R portions (the side areas) of the flat electrode assembly. It also has been found that by implementing a measure for preventing the catching of the electrode assembly occurring at the above portions, the above-described problems can be solved. The present invention has been accomplished based on these findings.

In accordance with the present invention, there is provided a cell comprising: a flat electrode assembly having a first electrode and a second electrode, the first electrode and the second electrode being arranged to opposed to each other with a separator therebetween and wound into a flat shape having two flat side R portions; and an outer casing for housing the flat electrode assembly, the outer casing being composed of a film composed of a metal layer and a resin layer laminated atop one another, wherein: the first electrode is located an outermost layer of the flat electrode assembly; and a portion of the first electrode corresponding to an upper end and/or a lower end of at least one of the flat side R portions is cut off, whereby a separator-exposed portion is formed where a portion of the separator wound immediately inside the outermost layer of the flat electrode assembly is exposed.

According to this structure, a portion of a first electrode 9, which is arranged as the outermost layer of a flat electrode assembly 1, is cut off, and thus a separator-exposed portion 11a where a separator 11 is exposed is formed, as shown by the circled portion in FIG. 4(a). This portion of the first electrode 9 corresponds to an upper end and/or a lower end of the flat side R portions, which are the four corners of the flat electrode assembly 1, where catching of the electrode assembly occurs most frequently. With this structure, even if catching occurs at the time of heat welding, it is not the first electrode but the separator-exposed portion 11a that is caught. That is, the separator 11 and an inner resin layer 102 are welded and thus sealing is carried out. Thus, there is no contact between the first electrode 9 and the metal layer 100 of the outer casing.

In this structure, the separator-exposed portion may be formed to correspond to each of the upper ends and lower ends of the flat side R portions.

While forming the separator-exposed portion 11a to correspond to one of the upper ends and lower ends of the side R portions is sufficient for preventing the catching of the first electrode of the flat electrode assembly 1, the separator-exposed portion 11a can be formed in the vicinity of each of the upper ends and lower ends of the two flat side R portions of the flat electrode assembly 1, as shown in FIG. 4(a). This prevents catching of side sealed portions 4b and 4c of the first electrode 9 more reliably.

In the above structure, the width "a" of the separator-exposed portion may be 1.0 mm or more while being 100% or less of the thickness L1 of the electrode assembly, and the height "b" of the separator-exposed portion may be 1.0 mm or more while being 20% or less of the width L2 of the first electrode.

As shown in FIG. 4(b), if the width "a" of the separator-exposed portion 11a is less than 1.0 mm, catching of the first electrode 9 may not be sufficiently prevented. On the other hand, if the width "a" of the separator-exposed portion 11a is greater than 100% of the thickness L1 of the electrode assembly 1, the amount of the active material of the first electrode 9 may be reduced causing reduced cell capacity, and the strength of the first electrode 9 may be reduced causing breakage of the first electrode 9.

As shown in FIGS. 4(a) and 4(b), if the height "b" of the separator-exposed portion 11a is less than 1.0 mm, catching of the first electrode 9 may not be sufficiently prevented. If the height "b" of the separator-exposed portion 11a is greater than 20% of the width L2 of the first electrode 9, the amount of the active material of the first electrode 9 may be reduced causing reduced cell capacity, and the strength of the first electrode 9 may be reduced causing breakage of the first electrode 9. In view of this, the above-specified ranges are preferable.

BRIEF DESCRIPTION OF THE DRAWINGS

FIG. 4(a) is a frontal view, and FIG. 4(b) is a side view.

FIG. 7(a) is a frontal view, and FIG. 7(b) is a side view.

REFERENCE NUMERAL

Figure 1:
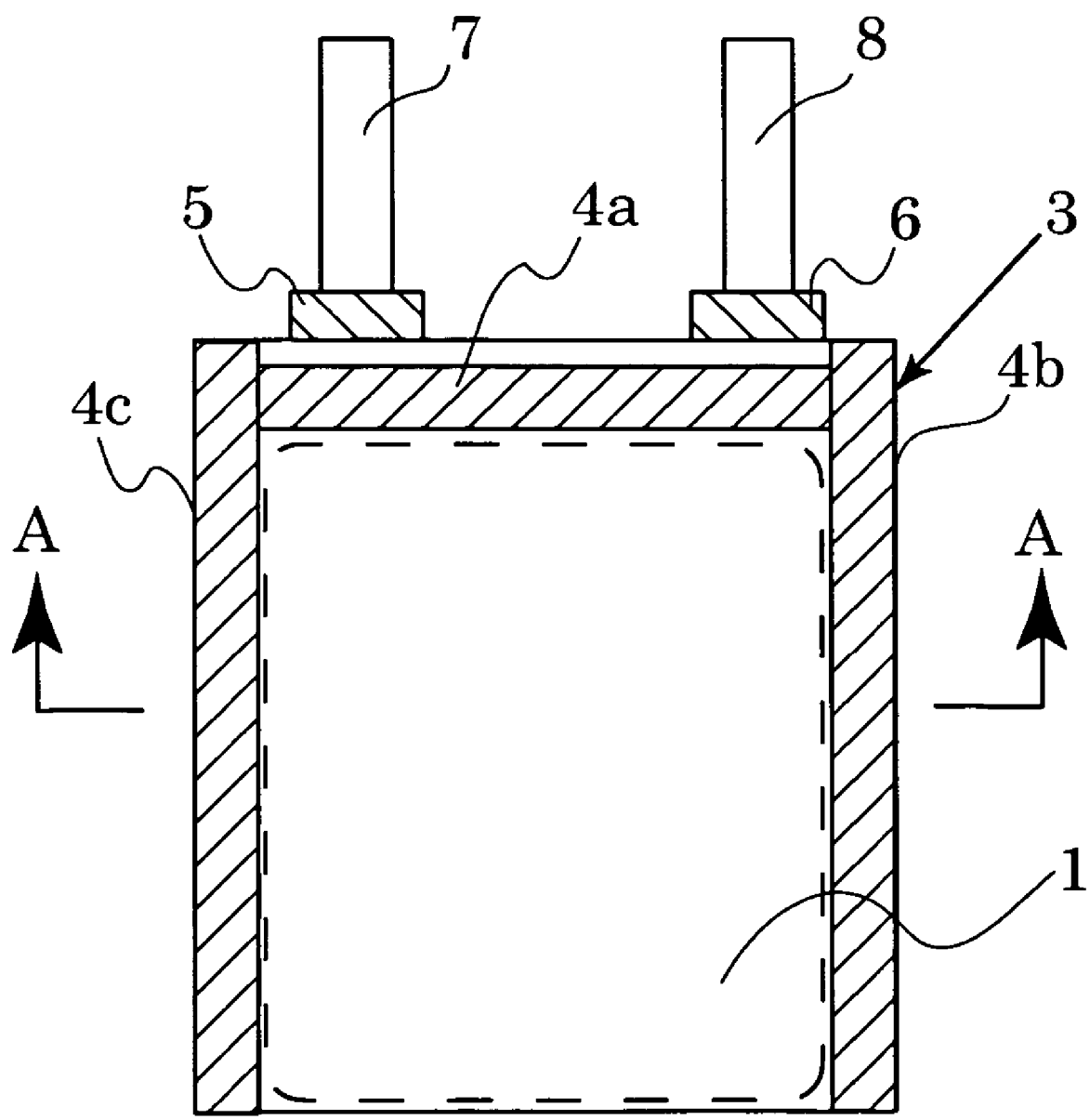
FIG. 1 is a frontal perspective view of a cell having an outer casing according to the present invention.

1 Electrode assembly
2 Storing space
3 Film outer casing
4a, 4b, 4c, 4d Sealed portion
5 Positive electrode tab film
6 Negative electrode tab film
7 Positive-electrode current-collecting tab
8 Negative-electrode current-collecting tab
9 Positive electrode (first electrode)
10 Negative electrode (second electrode)
11 Separator
11a Separator-exposed portion
100 Nylon layer
102 Polypropylene layer
103 Dry laminate adhesive layer
104 Carboxylic-acid modified polypropylene layer

DESCRIPTION OF THE PREFERRED EMBODIMENTS

Embodiment

The following is a description of a case in which the cell according to the present invention is applied to a lithium ion secondary cell in conjunction with drawings.

Figure 2:
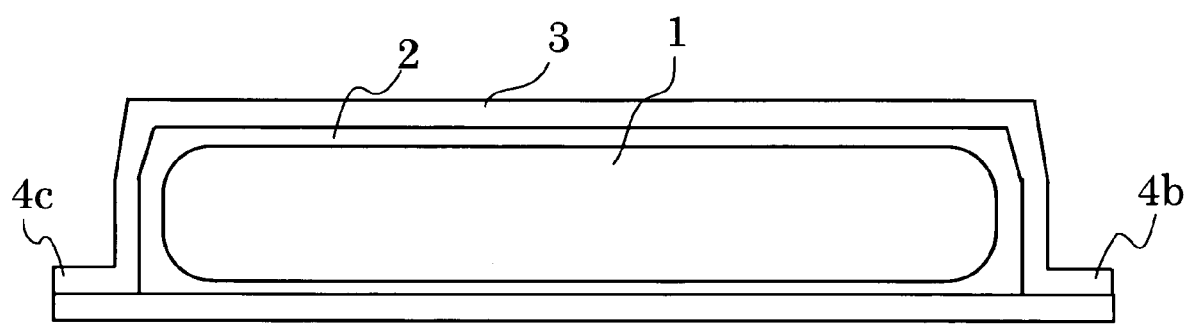
FIG. 2 is a sectional view of the cell taken along the line A-A shown in FIG. 1.

Referring to FIG. 1, a lithium ion secondary cell according to the present invention has an aluminum laminate outer casing 3 using an aluminum laminate material, which is an example of the film outer casing. As shown in FIG. 1, this aluminum laminate outer casing 3 has a bottom portion formed by folding a film, a tab-protruding sealed portion 4a that seals an opening portion with the electrode tabs protruding through the opening portion, and side sealed portions 4b and 4c. A housing space 2 is formed inside a body portion delimited by the bottom portion and the three-side sealed portions 4a, 4b, and 4c (see FIG. 2), and in this housing space 2 are housed a flat electrode assembly 1 and a non-aqueous electrolytic solution.

Figure 3:
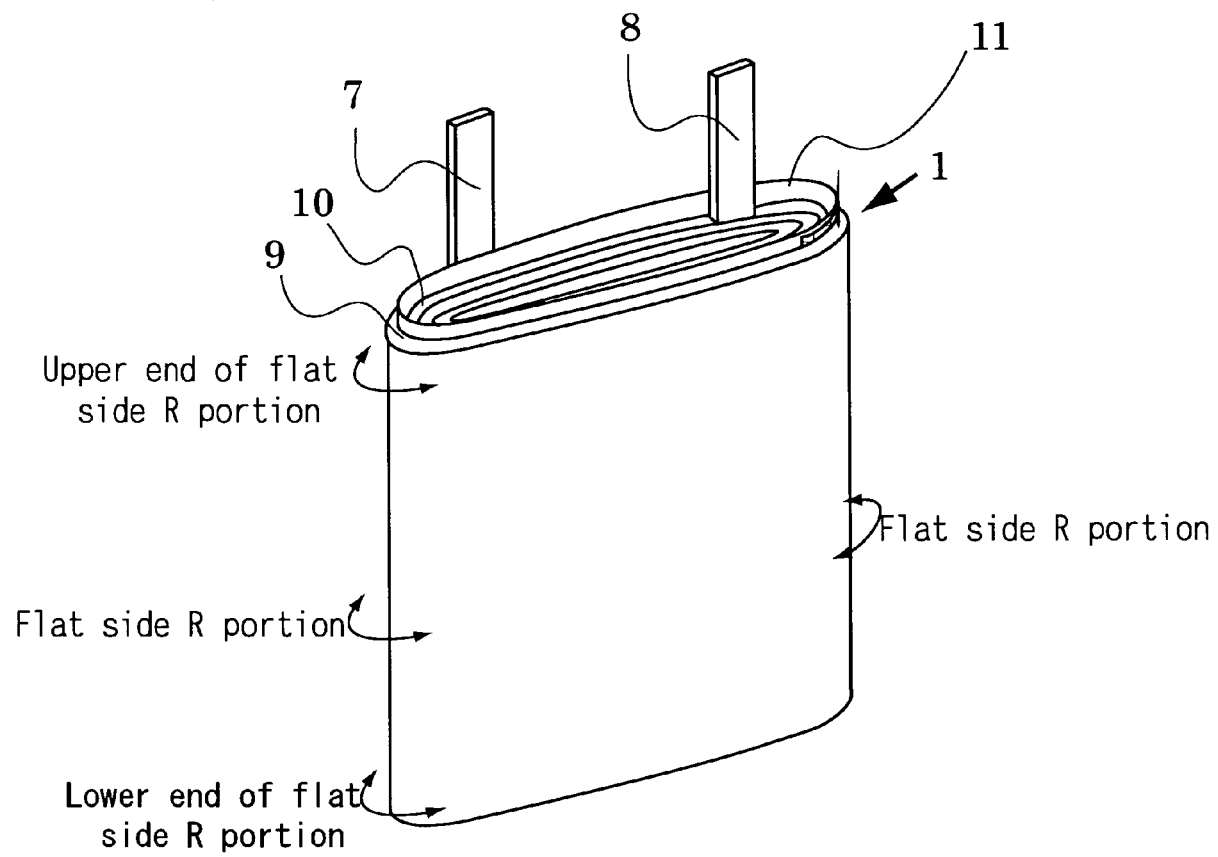
FIG. 3 is a perspective view of a flat electrode assembly used in the present invention.
Figure 4:
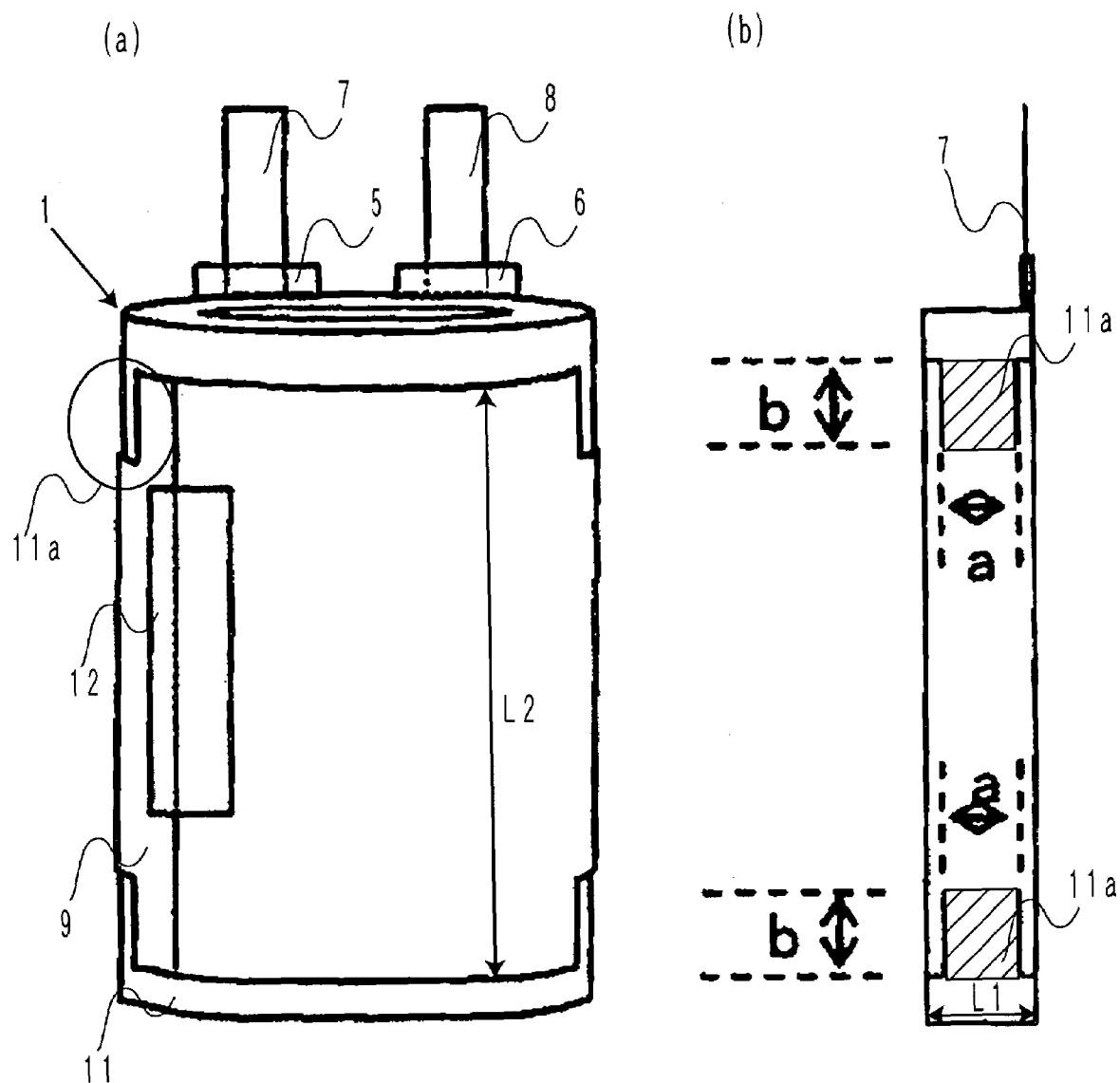
FIG. 4 is a view showing a flat electrode assembly used in the present invention.

Referring to FIG. 3, the flat electrode assembly 1 has the first electrode (positive electrode) 9 wound to serve as the outermost layer of the flat electrode assembly 1, and has two flat side R portions. Referring to FIG. 4, portions of the positive electrode 9 corresponding to the upper and lower end portions of the flat side R portions are cut off, and thus separator-exposed portions 11a where portions of the separator 11 located immediately inside the positive electrode 9 are formed.

Figure 5:
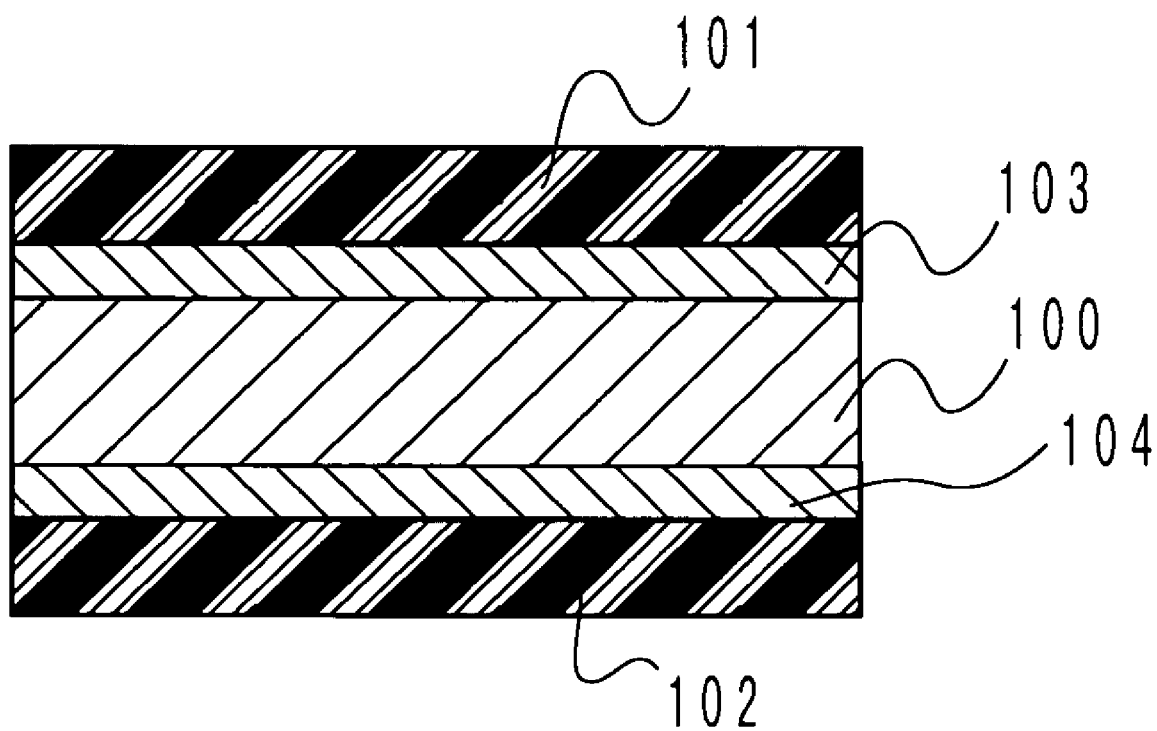
FIG. 5 is a cross sectional view of a laminate film used in the present invention.

Next, an aluminum laminate material, which is a constituent material of the outer casing 3, will be described. The aluminum laminate material, whose cross section is shown in FIG. 5, is of such a structure that on one surface of a metal layer 100 formed of aluminum of 35 μm thick, a nylon layer 101 (a layer on the outer surface of the cell) of 15 μm thick is formed, and on the other surface of the metal layer 100, a polypropylene layer 102 (a layer on the inner surface of the cell) of 25 μm thick is formed. Also, the structure is such that the metal layer 100 and the nylon layer 101 are adhered together with a dry laminate adhesive layer 103 of 5 μm thick, and the metal layer 100 and the polypropylene layer 102 are adhered together with a carboxylic-acid modified polypropylene layer 104 of 5 μm thick having a carboxyl group added to polypropylene.

It should be noted that applications of the present invention will not be limited to an outer casing using an aluminum laminate material of the above structure.

A method of preparing a lithium ion secondary cell of the above structure will be described.

<Preparation of the Positive Electrode>

A positive electrode active material made of lithium cobalt oxide ($LiCoO_2$), a carbon conductive agent such as acetylene black and graphite, and a binder made of polyvinylidene fluoride (PVdF) are prepared at a mass ratio of 90:5:5, respectively, and then mixed in an organic solvent made of N-methyl-2-pyrrolidone, thus preparing a positive electrode active material slurry.

Next, an aluminum foil of 28.5 mm wide (in the crosswise direction of the core body) and 725 mm long (in the longitudinal direction of the core body) is prepared. On both sides of this aluminum-foil core body, the positive electrode active material slurry is applied in uniform thickness using a die coater or a doctor blade.

This electrode plate is then passed through a drying apparatus to remove the organic solvent, thus preparing a dried electrode plate with an applied mass of 450 g/m². This dried electrode plate is drawn with pressure to a thickness of 0.16 mm using a roll-pressing apparatus.

While lithium cobalt oxide is used as a positive electrode active material for the lithium ion secondary cell according to this embodiment, a lithium-containing transition metal composite oxide can be used such as lithium nickel oxide ($LiNiO_2$), lithium manganese oxide ($LiMn_2O_4$), lithium iron oxide ($LiFeO_2$), or an oxide in which part of the transition metal contained in any of the above oxide is substituted with another element. These oxides can be use alone or in mixture of more than one oxide.

<Preparation of the Negative Electrode>

A negative electrode active material made of artificial graphite having a volume average particle diameter of 20 μm, a binder made of styrene butadiene rubber, and a thickening agent made of carboxy methyl cellulose are prepared at a mass ratio of 98:1:1, respectively, and then mixed with an appropriate amount of water, thus preparing a negative electrode active material slurry.

Next, a copper foil of 30.0 mm wide (in the crosswise direction of the core body) and 715 mm long (in the longitudinal direction of the core body) is prepared. On both sides of this copper-foil core body, the negative electrode active material slurry is applied in uniform thickness using a die coater or a doctor blade.

This electrode plate is then passed through a drying apparatus to remove the water, thus preparing a dried electrode plate with an applied mass of 200 g/m². This dried electrode plate is drawn with pressure to a thickness of 0.14 mm using a roll-pressing apparatus.

Examples of a negative electrode active material that can be used for the lithium ion secondary cell according to this embodiment include natural graphite, carbon black, coke, glass carbon, carbon fiber, a carbonaceous substance such as a baked body of any of the foregoing, and a mixture of the carbonaceous substance and at least one selected from the group consisting of lithium, a lithium alloy, and a metal oxide that can intercalate and deintercalate lithium.

<Preparation of the Electrode Assembly>

The positive electrode 9 is brought into connection with a positive-electrode current-collecting tab 7 made of aluminum, and the negative electrode 10 is brought into connection with a negative-electrode current-collecting tab 8 made of nickel. The width of the current-collecting tabs 7 and 8 is 3.0 mm, and the thickness of the current-collecting tabs 7 and 8 is 0.10 mm. Tab films 5 and 6 of a three-layered structure having modified polypropylene/high-melting-point resin/modified polypropylene are provided at the portions where the respective current-collecting tabs and the tab-protruding sealed portion 4a meet. The tab films are for reliable welding of the current-collecting tabs 7 and 8 and the aluminum laminate material, and for preventing contact between the current-collecting tabs 7 and 8 and the metal layer, which is a laminate layer, at the cross section of the laminate film. The positive electrode 9, the negative electrode 10, and a micro-porous-film separator 11 made of olefin resin are wound using a winding apparatus and taped using a wind-stopping tape 12, thus preparing a flat electrode assembly 1 shown in FIG. 3. Then, as shown in FIG. 4, the positive electrode 9, which is wound to serve as the outermost layer of the flat electrode assembly 1, has portions corresponding to the upper and lower end portions of the two flat side R portions are cut off, and thus separator-exposed portions 11a are formed. Thus, the flat electrode assembly 1 is completed.

In this embodiment, the width "a" of the separator-exposed portion 11a is 3.4 mm, and the height "b" of the separator-exposed portion 11a is 5.0 mm. Thus, a/L1 is 1.0 (100%), and b/L2 is 0.175 (17.5%).

It should be noted that the materials for the tab film and separator are not limited to those mentioned above.

<Preparation of the Electrolytic Solution>

Ethylene carbonate (EC), propylene carbonate (PC), and diethyl carbonate (DEC) are mixed at a volume ratio of 1:1:8 (at an atmospheric pressure of 1 and 25° C.), thus preparing a non-aqueous solvent. As electrolytic salt, $LiPF_6$ is dissolved in the non-aqueous solvent at 1.0 M (mole/liter), thus preparing an electrolytic solution.

The non-aqueous solvent is not limited to the above-mentioned combination; for example, a combination of a highly dielectric solvent and a low viscous solvent can be used. Examples of the highly dielectric solvent include ethylene carbonate, propylene carbonate, butylene carbonate, and γ-butyrolactone, all of which provide high solubility for lithium salt. Examples of the low viscous solvent include diethyl carbonate, dimethyl carbonate, ethyl methyl carbonate, 1,2-dimethoxyethane, tetrahydrofuran, anisole, 1,4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propanoate. Further, a mixture solvent containing two or more of the highly dielectric solvents and two or more of the low viscous solvents can be used. As electrolytic salt other than $LiPF_6$, $LiN(C_2F_5SO_2)_2$, $LiN(CF_3SO_2)_2$, $LiClO_4$, and $LiBF_4$ can be used alone or in mixture of two or more of the foregoing.

<Preparation of the Cell>

Figure 6:
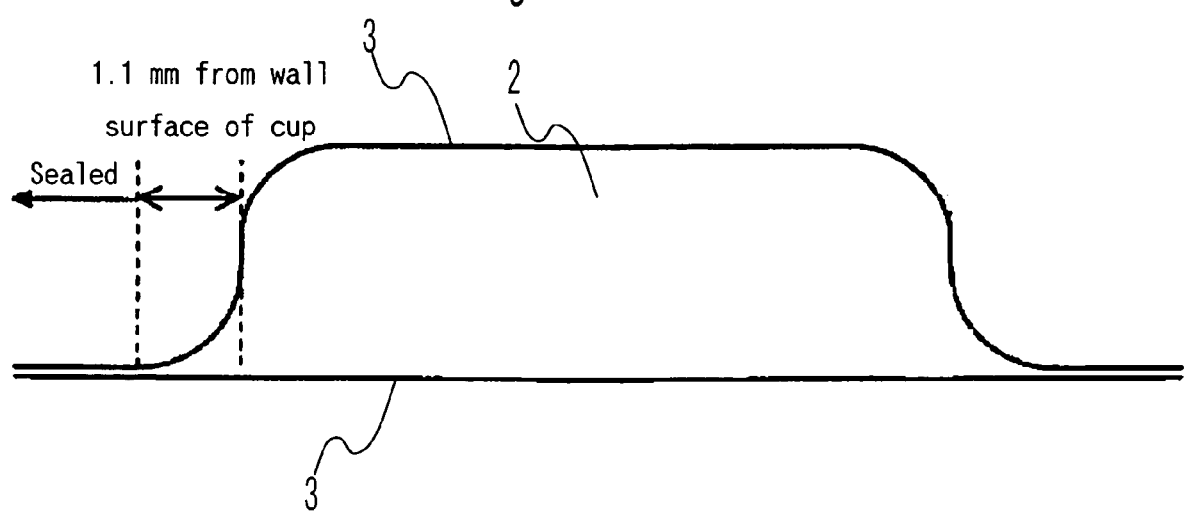
FIG. 6 is a view schematically showing a sealing step of side sealed portions 4b and 4c.

A laminate film is molded into a shape of a cup (a concave shape) to form a storing space 2, as shown in FIG. 6. Into this storing space 2, the above-described flat electrode assembly 1 is inserted. Then, the film is folded to form a bottom portion, and the sides of the film communicating with the bottom portion are subjected to heat welding in the manner shown in FIG. 6. Specifically, portions of these sides that are 1.1 mm from the wall surfaces of the cup shape are heat-welded at 200° C. for 3.0 seconds using a cuboid mould. Thus, side sealed portions 4b and 4c are formed. The thickness of the side sealed portions 4b and 4c is adjusted to 0.14 mm (±0.015 mm). Then, the electrolytic solution is inserted from the opening portion through which the tabs 7 and 8 are protruding. The opening portion is then sealed and a tab-protruding portion 4a is formed. Thus, a lithium ion secondary cell according to this embodiment is completed.

When forming the tab-protruding portion 4a, a metal mold with a concave portion of 5.5 mm wide and 0.06 mm deep is used at the portion where the current-collecting tabs and the laminate film are welded, in order to prevent short-circuiting between the current-collecting tabs 7 and 8 and the metal layer of the outer casing. Using this metal mold, heat welding is carried out at 200° C. for 5.0 seconds. The thickness of the sealed portion 4 is 0.140 (±0.015 mm) at the portion where the current-collecting tabs do not exist and 0.250 mm (±0.015 mm) at the portions where the current-collecting tabs exist. Thus, the thickness at the portions where the current-collecting tabs exist is thicker than the portion without them.

EXAMPLE 1

In this example, a cell was prepared in the same manner as in the embodiment.

Comparative Example 1

Figure 7:
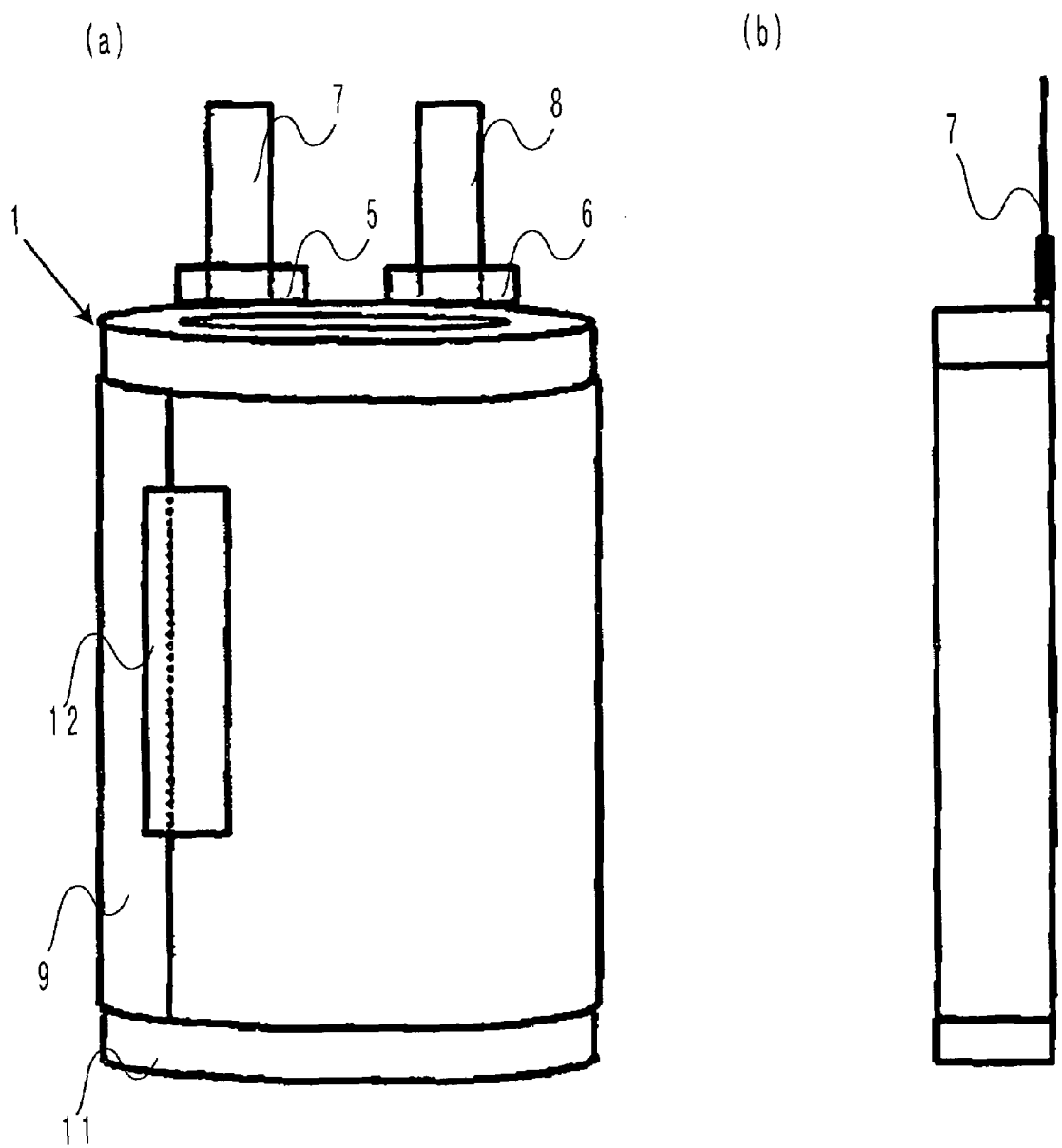
FIG. 7 is a view showing a flat electrode assembly used in comparative example 1.
Figure 8:
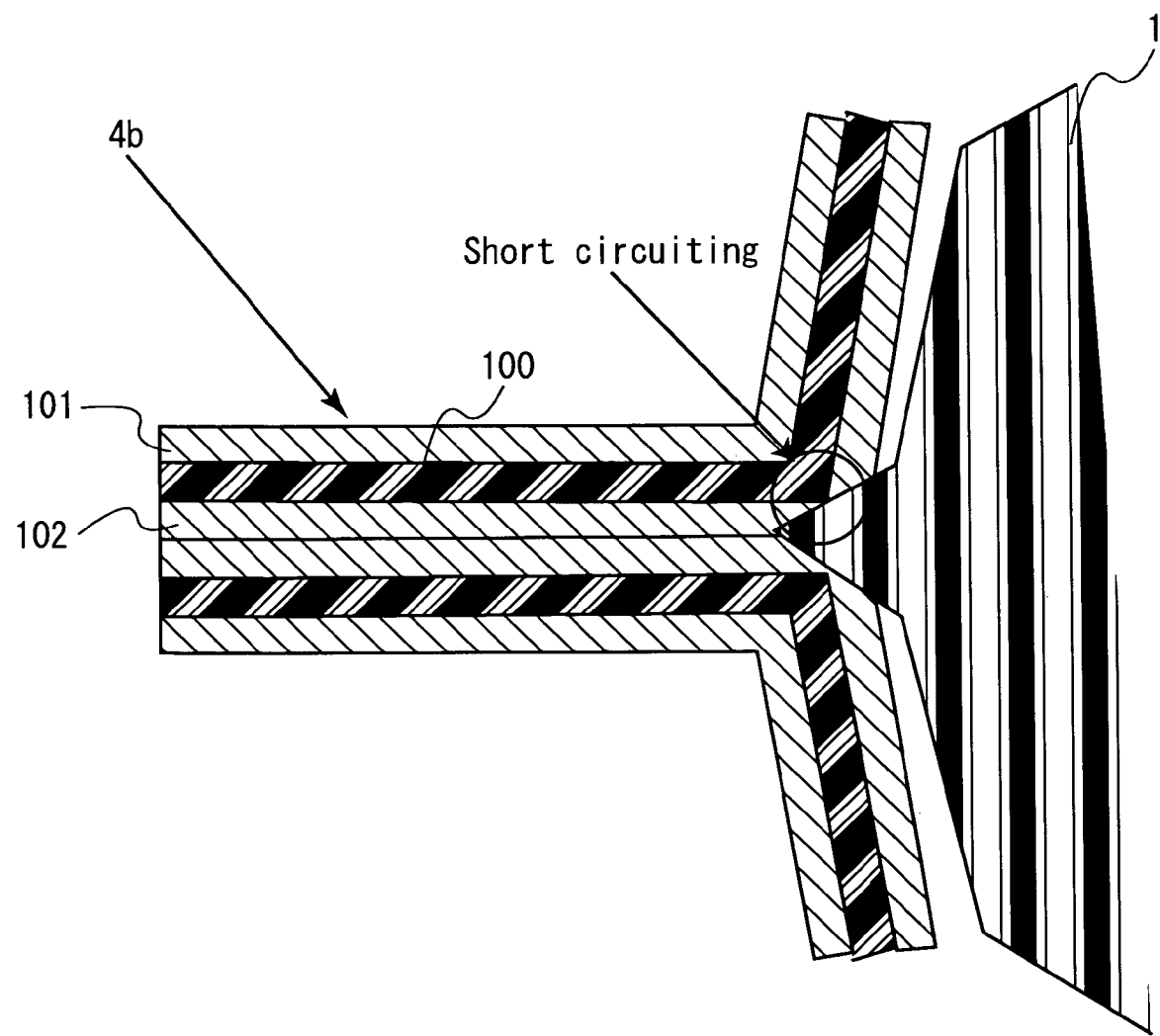
FIG. 8 is a partly enlarged cross sectional view of a sealed portion and an electrode assembly, showing the catching of the electrode assembly by the sealed portion.
Figure 9:
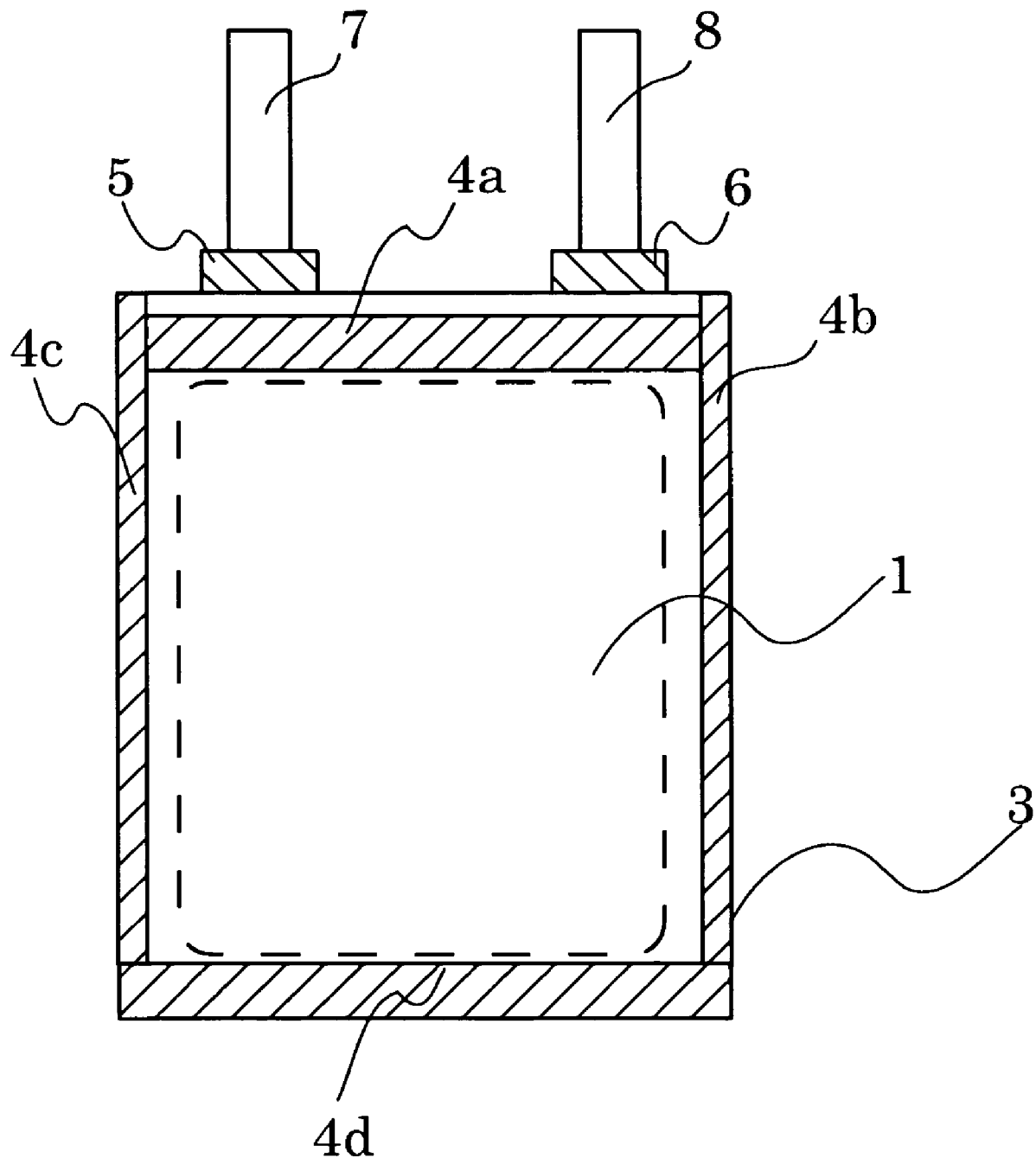
FIG. 9 is a frontal perspective view of a cell having an outer casing according to patent document 1.

A cell was prepared in the same manner as in Example 1 except that portions of the flat electrode assembly 1 corresponding to the upper and lower ends of the flat side R portions were not cut off (that is, separator-exposed portions were not formed), as shown in FIG. 7.

[Measurement of Frequency of Short Circuits]

A hundred cell samples were prepared each from Example 1 and Comparative Example 1. The occurrence of conduction between the current-collecting tab 7 and the metal layer of the outer casing was examined using a tester. A detection of conduction was counted as an occurrence of a short circuit.

In the short circuit test, no short circuits occurred in the hundred cell samples from Example 1. Among the hundred cell samples from Comparative Example 1, however, four cell samples had short circuits.

It can be seen from the results that with the cell having a film outer casing according to the present invention, there is no short-circuiting caused by catching of the electrode assembly in the sealed portion, and thus the cell has high volume energy density and excellent sealing performance.

(Supplementary Remarks)

While in Example 1 the separator-exposed portion 11a is rectangular, it will be readily appreciated that the shape of the separator-exposed portion 11a is not limited to the rectangular shape in this invention; a semicircle, a semi-ellipse, a polygon, and the like can be contemplated. Also, the present invention can be applied not only to cells of the three-side sealed structure but to cells of the four-side sealed structure as in patent document 1.

While in Example 1 the upper and lower end portions of the flat side R portions of the flat electrode assembly are cut off after preparing the flat electrode assembly by winding the positive electrode, the negative electrode, and the separator, the corresponding portions of the positive electrode can be cut off before winding the positive electrode, the negative electrode, and the separator to prepare the flat electrode assembly. As the first electrode, the negative electrode can be used.

What is claimed is:

1. A cell comprising:

a flat electrode assembly having a first electrode and a second electrode, the first electrode and the second electrode being arranged to opposed to each other with a separator therebetween and wound into a flat shape having two flat side R portions; and an outer casing for housing the flat electrode assembly, the outer casing being composed of a film composed of a metal layer and a resin layer laminated atop one another, wherein:

a width of the first electrode is smaller than that of the separator;

the first electrode is located an outermost layer of the flat electrode assembly; and a portion of the first electrode corresponding to an upper end and/or a lower end of at least one of the flat side R portions is cut off, whereby a separator-exposed portion is formed where a portion of the separator wound immediately inside the outermost layer of the flat electrode assembly is exposed through the cut off portion;

wherein a width "a" of the separator-exposed portion is 1.0 mm or more while being 100% or less of a thickness L1 of the electrode assembly, and a height "b" of the separator-exposed portion is 1.0 mm or more while being 20% or less of a width L2 of the first electrode.

2. The cell according to claim 1, wherein the separator-exposed portion is formed to correspond to each of upper ends and lower ends of the flat side R portions.

* * * * *